(12) United States Patent
Zhou et al.

(10) Patent No.: US 8,799,584 B2
(45) Date of Patent: Aug. 5, 2014

(54) METHOD AND APPARATUS FOR IMPLEMENTING MULTI-PROCESSOR MEMORY COHERENCY

(75) Inventors: Xiping Zhou, Shenzhen (CN); Jingyu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 595 days.

(21) Appl. No.: 13/077,191

(22) Filed: Mar. 31, 2011

(65) Prior Publication Data

US 2012/0079209 A1   Mar. 29, 2012

(30) Foreign Application Priority Data

Mar. 31, 2010   (CN) .......................... 2010 1 0137699

(51) Int. Cl.
```
G06F 13/12      (2006.01)
G06F 12/08      (2006.01)
G06F 15/167     (2006.01)
G06F 13/38      (2006.01)
```
(52) U.S. Cl.
CPC ............ *G06F 13/38* (2013.01); *G06F 12/0815* (2013.01); *G06F 12/08* (2013.01); *G06F 12/0811* (2013.01); *G06F 15/167* (2013.01); *G06F 12/084* (2013.01)
USPC ............ 711/141; 711/118; 711/142; 711/143

(58) Field of Classification Search
USPC .......................... 711/141, 118, 122, 142, 143
See application file for complete search history.

(56) References Cited

PUBLICATIONS

Office Action issued in corresponding Chinese Patent Application No. 201010137699.8, mailed Apr. 26, 2011.
Office Action issued in corresponding Chinese Patent Application No. 201010137699.8, mailed Nov. 1, 2011.
White Paper, "The ATM Cortex-A9 Processors" Document Revision 2.0, Sep. 2009.
Marino, "32-Core CMP with Multi-Sliced L2: 2 and 4 Cores Sharing a L2 Slice" Proceedings of the 18th International Symposium on Computer Architecture and High Performance Computing, IEEE 2006.

*Primary Examiner* — Jae Yu
(74) *Attorney, Agent, or Firm* — Brinks Gilson & Lione

(57) ABSTRACT

A method and an apparatus for implementing multi-processor memory coherency are disclosed. The method includes: a Level-2 (L2) cache of a first cluster receives a control signal of the first cluster for reading first data; the L2 cache of the first cluster reads the first data in a Level-1 (L1) cache of a second cluster through an Accelerator Coherency Port (ACP) of the L1 cache of the second cluster if the first data is currently maintained by the second cluster, where the L2 cache of the first cluster is connected to the ACP of the L1 cache of the second cluster; and the L2 cache of the first cluster provides the first data read to the first cluster for processing. The technical solution under the present invention implements memory coherency between clusters in the ARM Cortex-A9 architecture.

2 Claims, 11 Drawing Sheets

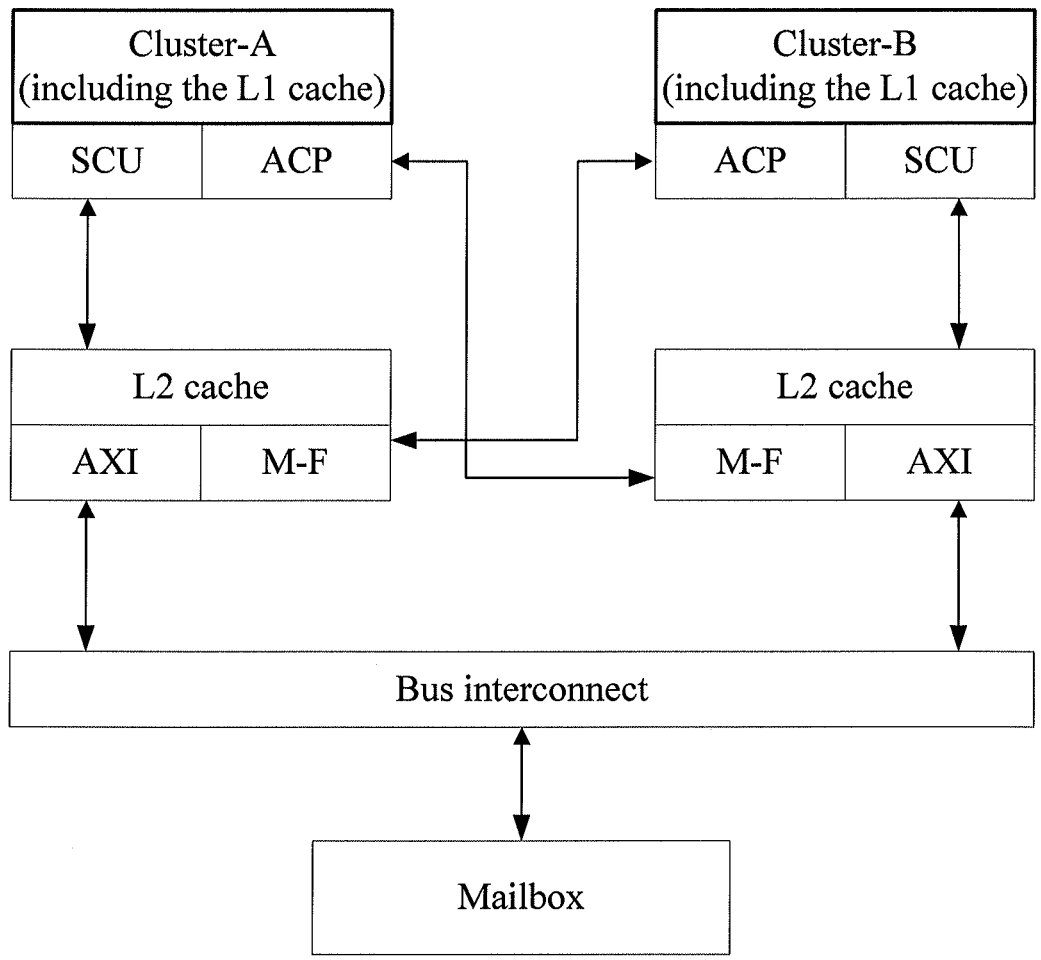
FIG. 3-a

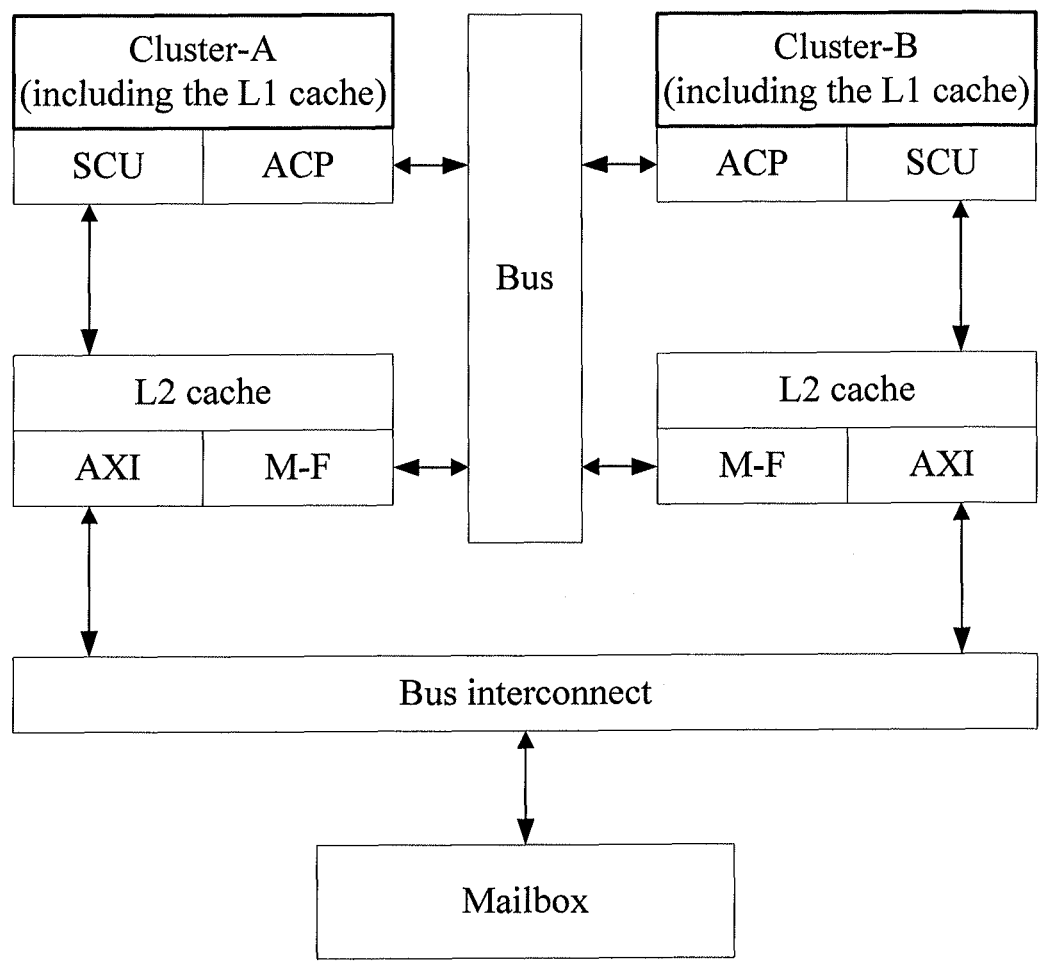
FIG. 3-b

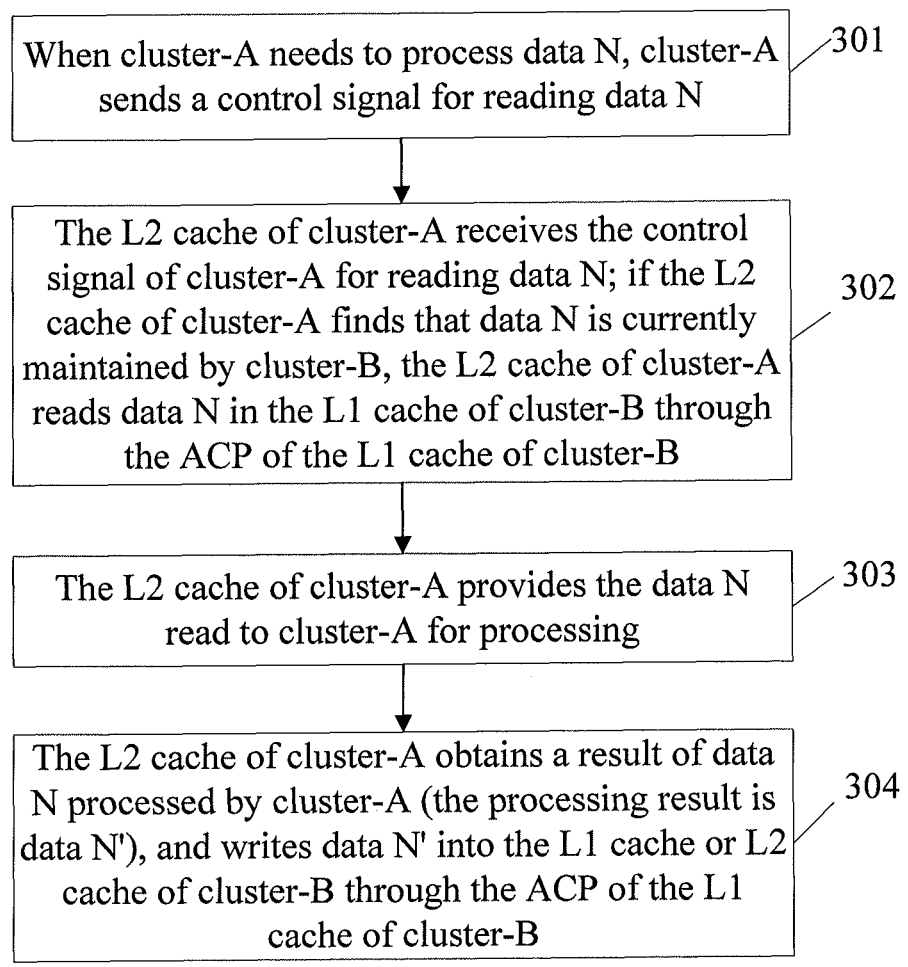
FIG. 3-c

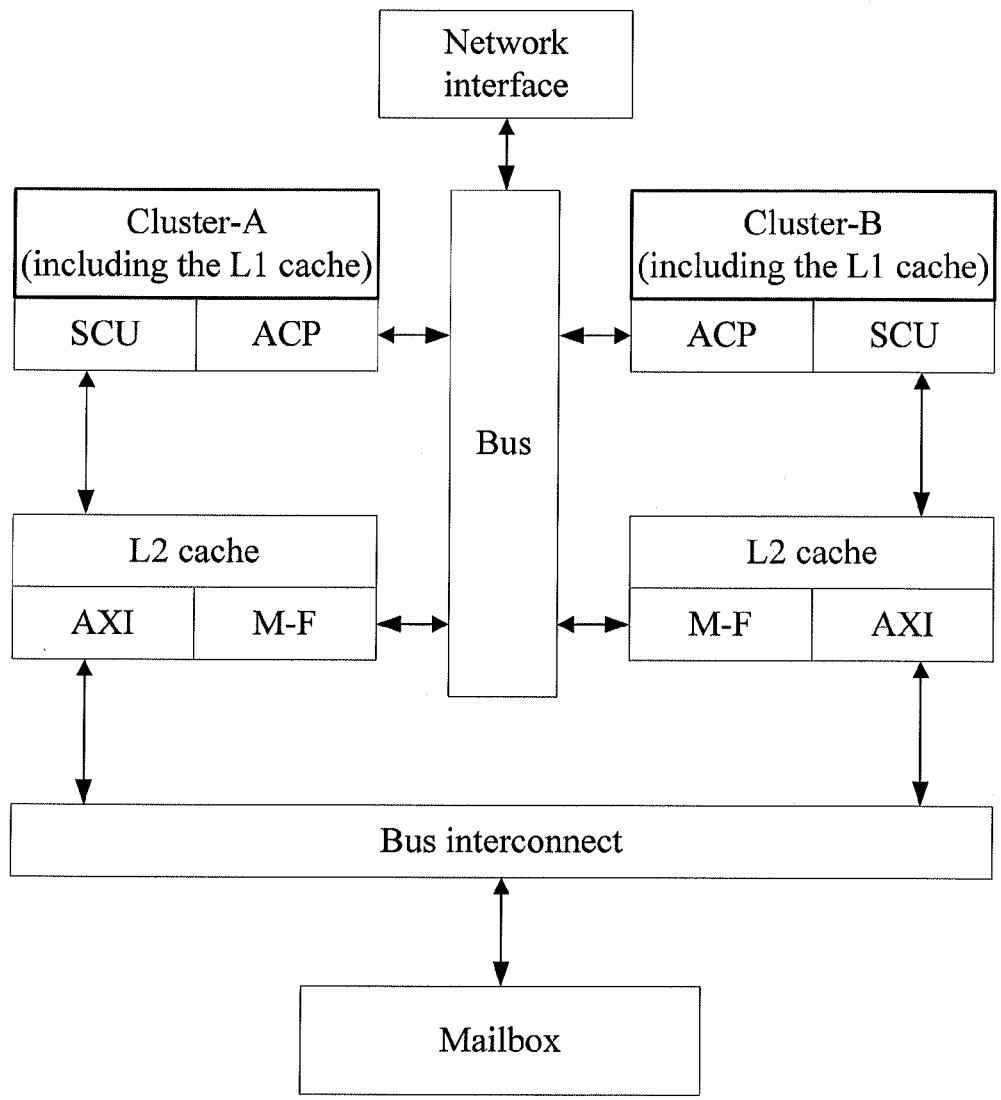
FIG. 3-d

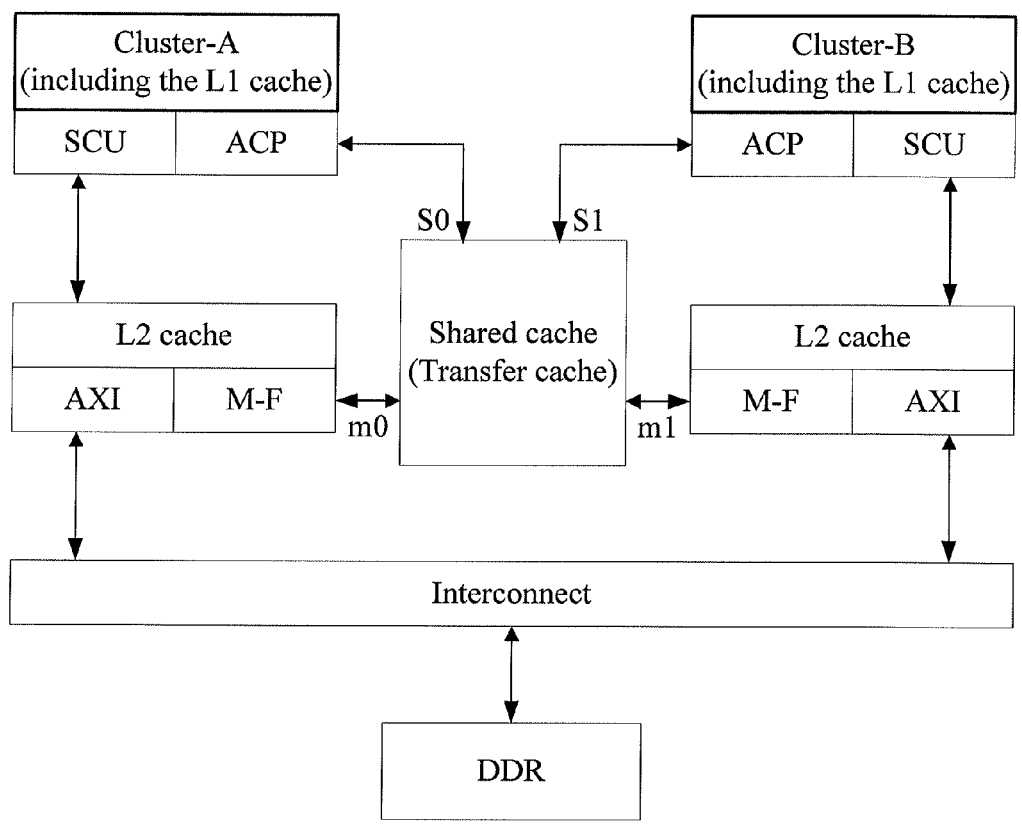
FIG. 5-a

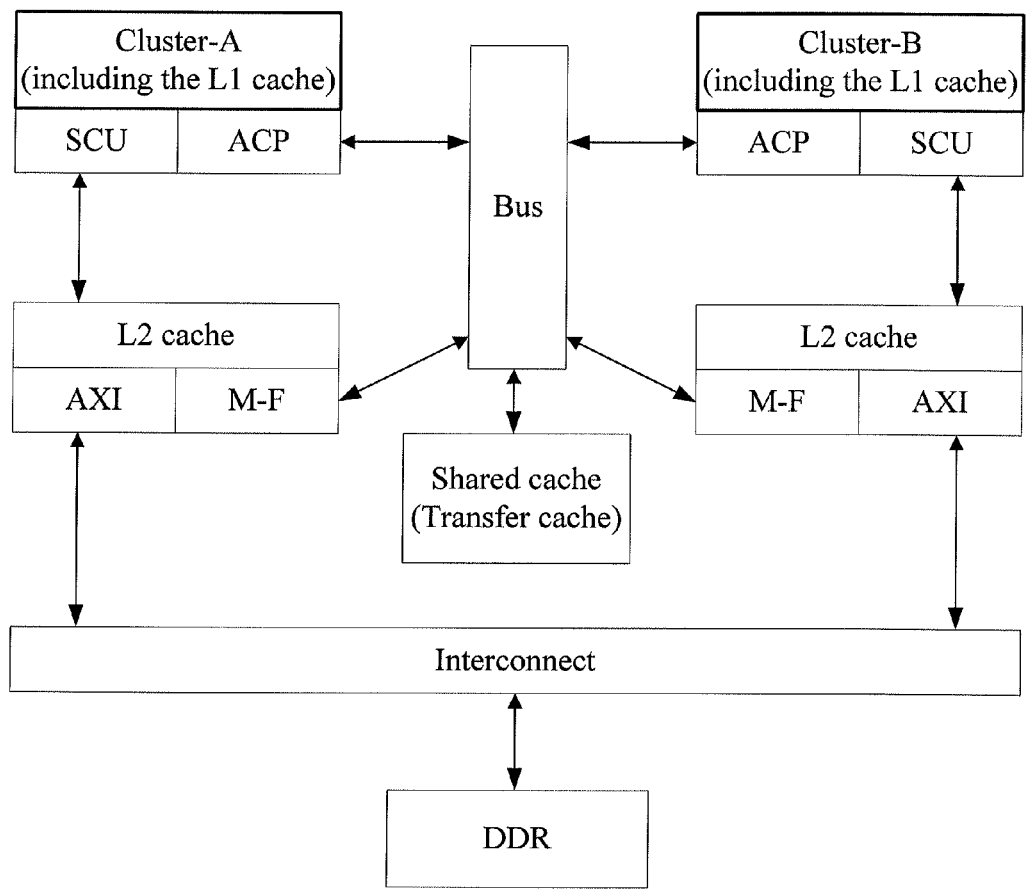
FIG. 5-b

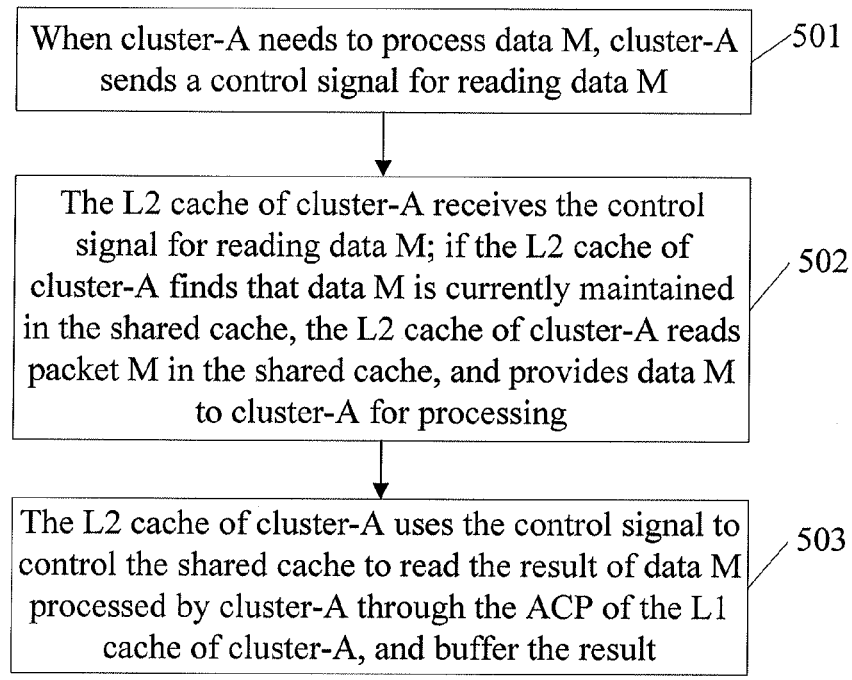
FIG. 5-c
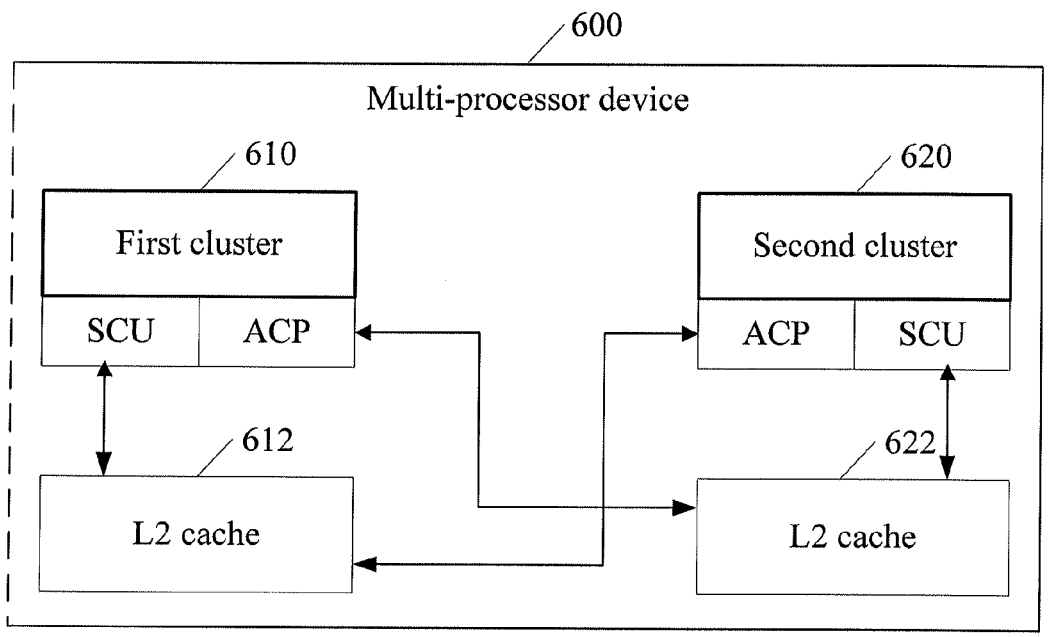
FIG. 6-a

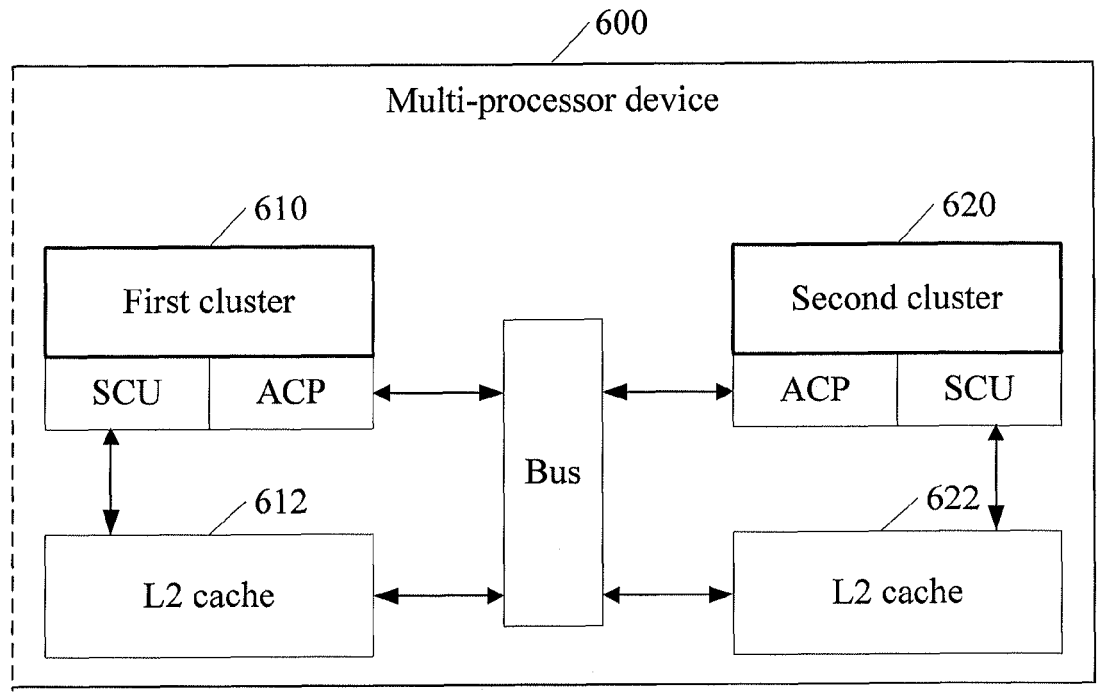
FIG. 6-b
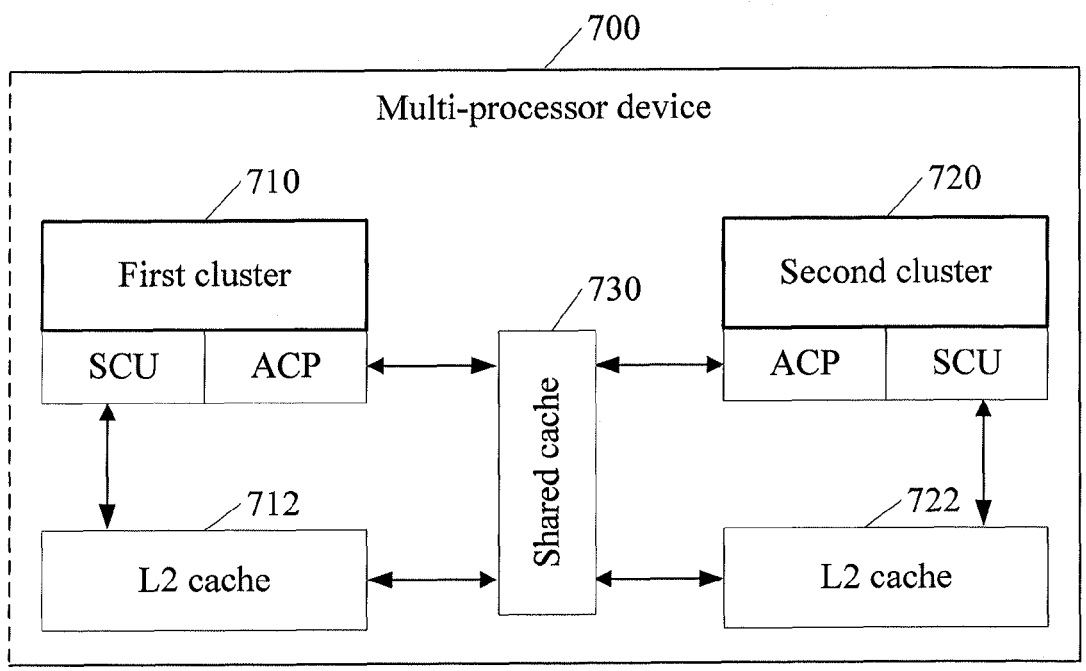
FIG. 7-a

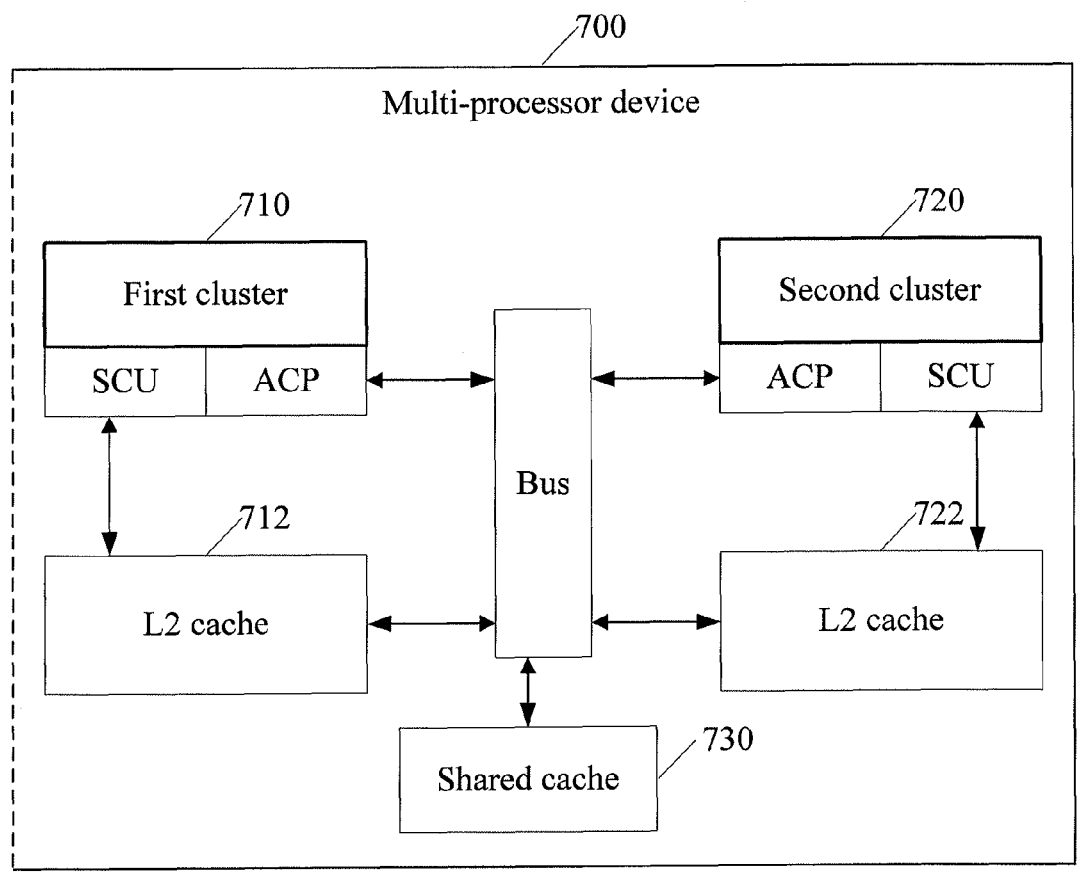
FIG. 7-b

METHOD AND APPARATUS FOR IMPLEMENTING MULTI-PROCESSOR MEMORY COHERENCY

CROSS-REFERENCE TO RELATED APPLICATION

This application claims priority to Chinese Patent Application No. 201010137699.8, filed on Mar. 31, 2010, which is hereby incorporated by reference in its entirety.

FIELD OF THE INVENTION

The present invention relates to computer technologies, and in particular, to a method for implementing multi-processor memory coherency and a multi-processor device.

BACKGROUND OF THE INVENTION

Currently, a Cortex-A9 Multi-Processor core (MPcore) is put forward by ARM, a leading semiconductor intellectual attribute supplier. The Cortex-A9 MPcore supports up to four processors. Memory coherency is ensured between processors in a cluster through a Snooping Control Unit (SCU). A cluster includes four processors.

Generally, a Level-1 (L1) cache exists in a cluster. To further improve efficiency of reading data, a Level-2 (L2) cache is generally configured for the cluster. However, the L1 cache of the Cortex-A9 MPcore supports write-back only, and does not support write-through, namely, cannot update the L2 cache synchronously after updating the L1 cache, which leads to cache incoherency between clusters.

The ARM Cortex-A9 series currently provide no solution to collaboration between more than four processors, which makes it rather inconvenient to apply more than four processors. For example, a product requires architecture that includes more than four processors. A task needs to be distributed into multiple processors and processed in pipeline mode. If a task is processed by one cluster but is terminated by another cluster, the pipeline processing needs to be performed between different clusters, which causes cache incoherency between clusters.

SUMMARY OF THE INVENTION

Embodiments of the present invention provide a method and an apparatus for implementing multi-processor memory coherency so that memory coherency can be implemented between clusters in ARM Cortex-A9 architecture.

The embodiments of the present invention are based on the following technical solution:

A method for implementing multi-processor memory coherency includes:

receiving, by an L2 cache of a first cluster, a control signal of the first cluster for reading first data;

reading the first data in an L1 cache of a second cluster through an Accelerate Coherency Port (ACP) of the L1 cache of the second cluster if the first data is currently maintained by the second cluster, where the L2 cache of the first cluster is connected to the ACP of the L1 cache of the second cluster; and providing the first data read to the first cluster for processing.

A method for implementing multi-processor memory coherency includes:

receiving, by an L2 cache of a first cluster, a control signal of the first cluster for reading second data;

reading the second data in a shared cache if the second data is currently maintained in the shared cache, where the shared cache is connected to an ACP of an L1 cache of the first cluster and the L2 cache of the first cluster; and providing the second data read to the first cluster for processing.

A multi-processor device includes a first cluster, a second cluster, an L2 cache of the first cluster, and an L2 cache of the second cluster, where:

the L2 cache of the first cluster is connected to an ACP of an L1 cache of the second cluster; and the L2 cache of the first cluster is configured to receive a control signal of the first cluster for reading first data; read the first data in the L1 cache of the second cluster through the ACP of the L1 cache of the second cluster if the first data is currently maintained by the second cluster; and provide the first data read to the first cluster for processing.

A multi-processor device includes a first cluster, a second cluster, a shared cache, an L2 cache of the first cluster, and an L2 cache of the second cluster, where:

the shared cache is connected to the L2 cache of the first cluster and an ACP of an L1 cache of the first cluster; and the L2 cache of the first cluster is configured to receive a control signal of the first cluster for reading second data; read the second data in the shared cache if the second data is currently maintained in the shared cache; and provide the second data read to the first cluster for processing.

It is thus evident that in a solution under the present invention, if multiple clusters in the system need to process data jointly, when the first cluster needs to process data which is currently maintained by the second cluster, the first cluster uses an ACP of the L1 cache of the second cluster to read the data from the L1 cache of the second cluster, and process the data. Because the data is read from the L1 cache of the second cluster which currently maintains the data, the validity of the data is ensured. This processing mode ensures memory coherency between multiple clusters, and enables collaboration between more than four processors.

In another solution under the present invention, if multiple clusters in the system need to process data jointly, a shared cache is added and connected to the ACP of the L1 cache and the L2 cache of each cluster. When the first cluster needs to process data which is currently maintained in the shared cache, the L2 cache of the first cluster reads the data in the shared cache and provides the data to the first cluster for processing. Because the data that requires joint processing of multiple clusters is maintained in the shared cache, all clusters obtain the data from the shared cache. This processing mode ensures memory coherency between multiple clusters, and enables collaboration between more than four processors.

BRIEF DESCRIPTION OF THE DRAWINGS

To make the technical solution under the present invention clearer, the following describes the accompanying drawings involved in the description of the embodiments of the present invention. Apparently, the accompanying drawings outlined below are illustrative and not exhaustive, and persons of ordinary skill in the art can derive other drawings from such accompanying drawings without any creative effort.

FIG. 3-*a* shows a multi-processor device provided in a second embodiment of the present invention;

FIG. 3-*b* shows another multi-processor device provided in the second embodiment of the present invention;

FIG. 3-*c* is a flowchart of a method for implementing multi-processor memory coherency in the second embodiment of the present invention;

FIG. 3-*d* shows another multi-processor device provided in the second embodiment of the present invention;

FIG. 5-*a* shows a multi-processor device provided in a fourth embodiment of the present invention;

FIG. 5-*b* shows another multi-processor device provided in the fourth embodiment of the present invention;

FIG. 5-*c* is a flowchart of a method for implementing multi-processor memory coherency in the fourth embodiment of the present invention;

FIG. 6-*a* shows a multi-processor device provided in a fifth embodiment of the present invention;

FIG. 6-*b* shows another multi-processor device provided in the fifth embodiment of the present invention;

FIG. 7-*a* shows a multi-processor device provided in a sixth embodiment of the present invention; and FIG. 7-*b* shows another multi-processor device provided in the sixth embodiment of the present invention.

DETAILED DESCRIPTION OF THE EMBODIMENTS

The embodiments of the present invention provide a method and an apparatus for implementing multi-processor memory coherency so that memory coherency can be implemented between clusters of ARM Cortex-A9 architecture.

The following provides more details.

Figure 1:
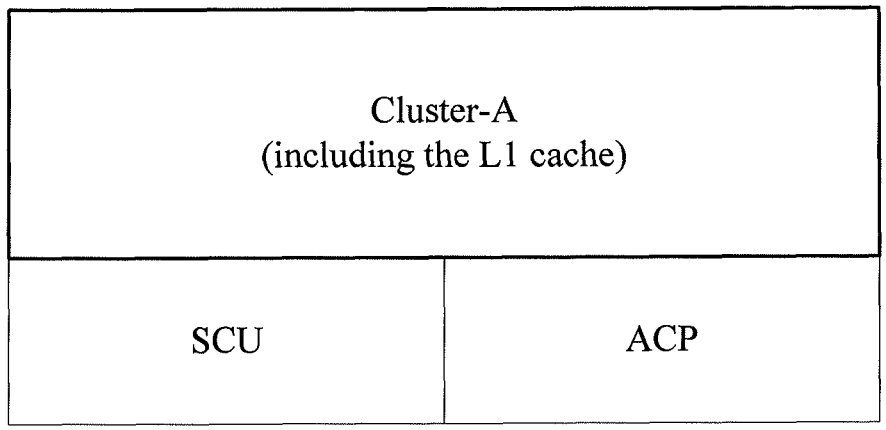
FIG. 1 shows an external structure of a cluster in an embodiment of the present invention.

FIG. 1 shows an external structure of a cluster in Cortex-A9 architecture. A cluster includes: four processors, an L1 cache, an SCU, and an ACP. The SCU ensures memory coherency between processors in a cluster. The SCU of the cluster may be connected to an L2 cache of the cluster. An external device may access the L1 cache of the cluster through the ACP of the cluster. For example, the external device may read data from the L1 cache of the cluster through the ACP of the cluster, or write data into the L1 cache of the cluster through the ACP of the cluster.

The solution provided in this embodiment ensures memory coherency between clusters of the foregoing structure during the collaboration of the clusters.

Embodiment 1

Figure 2:
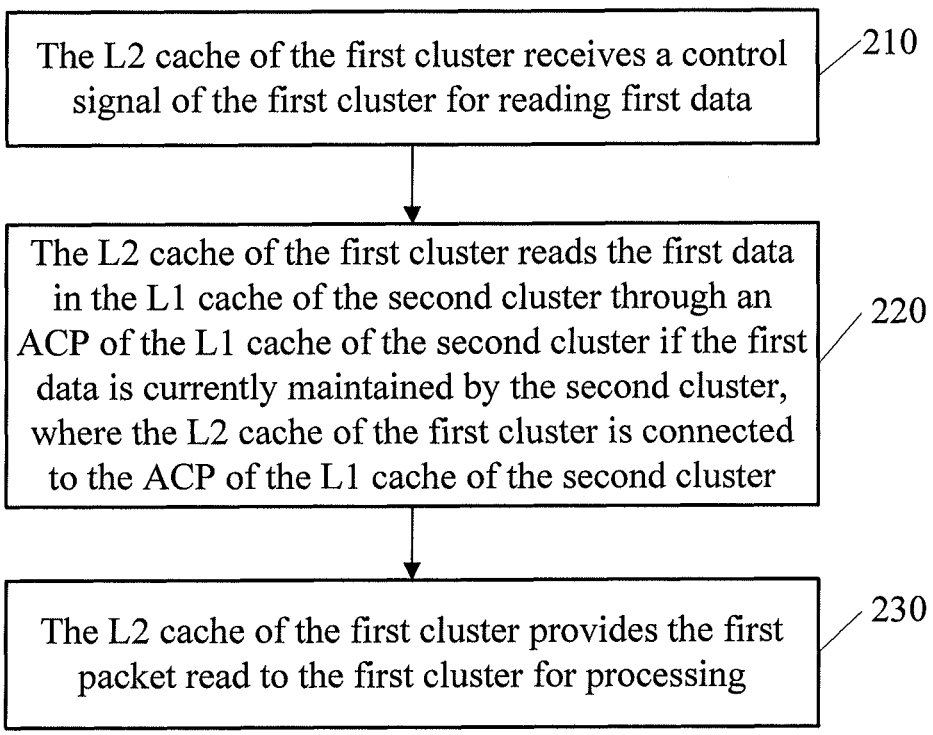
FIG. 2 is a flowchart of a method for implementing multi-processor memory coherency in a first embodiment of the present invention.

The following describes the process of implementing memory coherency of the first cluster, assuming that the multi-processor device in ARM Cortex-A9 architecture includes at least a first cluster and a second cluster which process data jointly, where an L2 cache of the first cluster is responsible for implementing multi-processor memory coherency of the first cluster. As shown in FIG. 2, the method for implementing multi-processor memory coherency may include the following steps:

210. The L2 cache of the first cluster receives a control signal of the first cluster for reading the first data.

In an application scenario, when the first cluster needs to process the first data, the first cluster may send a control signal for reading the first data. For example, when the first data is currently maintained by the second cluster, the second cluster may maintain the first data in the L1 cache of the second cluster.

220. The L2 cache of the first cluster reads the first data in the L1 cache of the second cluster through an ACP of the L1 cache of the second cluster if the first data is currently maintained by the second cluster, where the L2 cache of the first cluster is connected to the ACP of the L1 cache of the second cluster.

In practice, the interface set on the L2 cache of the cluster may be an Advanced Extensible Interface (AXI) bus interface or a Master-Filter (M-F) interface. The L2 cache may be connected to the system bus through the AXI bus interface, or connected to other devices through the M-F interface.

For example, the L2 cache of the first cluster is connected to the ACP of the L1 cache of the second cluster directly, or through a bus (namely, the M-F interface of the L2 cache of the first cluster and the ACP of the L1 cache of the second cluster are connected to the bus separately; in this architecture, the M-F interface of the L2 cache of one or more other clusters and the ACP of the L1 cache can also be connected to this bus to implement interworking of multiple clusters). By connecting the bus to the M-F interface of the L2 cache and the ACP of the L1 cache, the clusters can be extended conveniently.

In this case, through the ACP of the L1 cache of the second cluster, it is practicable to read the first data in the L1 cache of the second cluster. The first data may be original data, or a result of data processed by the second cluster or other clusters for one or more times.

In an application scenario, when the first data is currently maintained by the second cluster, the L2 cache of the first cluster may send a control signal for reading the first data to the L1 cache of the second cluster through an ACP of the L1 cache of the second cluster, where the operation attribute of the control signal is "cacheable"; and the L2 cache of the first cluster may read the first data in the L1 cache of the second cluster, thus achieving a high reading efficiency.

230. The L2 cache of the first cluster provides the first data read to the first cluster for processing.

If the second cluster also needs to participate in the inter-cluster processing, the L2 cache of the second cluster may be connected to the ACP of the L1 cache of the first cluster through an M-F interface directly or through a bus (namely, the M-F interface of the L2 cache of the second cluster and the ACP of the L1 cache of the first cluster are connected to the bus separately). The multi-processor memory coherency of the second cluster may also be implemented by the L2 cache of the second cluster. The implementation process is similar to the practice of the L2 cache of the first cluster, and is not described further.

Although the L2 cache of the first cluster is responsible for implementing the multi-processor memory coherency in this embodiment, those skilled in the art can use other components instead to implement the multi-processor memory coherency based on the conception disclosed above.

It is thus evident that in this embodiment, if multiple clusters in the system need to process data jointly, when the first cluster needs to process data which is currently maintained by the second cluster, the first cluster uses an ACP of the L1 cache of the second cluster to read the data from the L1 cache of the second cluster, and process the data. Because the data is read from the L1 cache of the second cluster which currently maintains the data, the validity of the data is ensured. This processing mode ensures memory coherency between multiple clusters, and enables collaboration between more than four processors.

Further, after the first cluster processes the first data, a result of the processing is obtained. The result of processing the first data is written into the L1 cache or L2 cache of the second cluster through the ACP of the L1 cache of the second cluster (the result is maintained in the L1 cache or L2 cache of the second cluster so that the result can be processed by the second cluster or other clusters subsequently); or, the result of processing the first data is buffered in the L2 cache of the first cluster.

Embodiment 2

The following description assumes that a multi-processor device in ARM Cortex-A9 architecture includes at least cluster-A and cluster-B which process data jointly.

In this embodiment, the connection relation between cluster-A and cluster-B of the multi-processor device in this embodiment may be shown in FIG. 3-a. In this architecture, the SCU of cluster-A is connected to the L2 cache of cluster-A; the AXI bus interface of the L2 cache of cluster-A is connected to the system bus; the M-F interface of the L2 cache of cluster-A is connected to the ACP of the L1 cache of cluster-B directly; the SCU of cluster-B is connected to the L2 cache of cluster-B; the AXI bus interface of the L2 cache of cluster-B is connected to the system bus; and the M-F interface of the L2 cache of cluster-B is connected to the ACP of the L1 cache of cluster-A directly. Alternatively, the connection relation between cluster-A and cluster-B of the multi-processor device in this embodiment may be shown in FIG. 3-b. In this architecture, the M-F interfaces of the L2 cache of cluster-A and cluster-B are connected to the bus separately, and the ACPs of the L1 cache of cluster-A and cluster-B are connected to the bus separately, namely, the M-F interface of the L2 cache of cluster-A is connected to the ACP of the L1 cache of cluster-B through the bus, and the M-F interface of the L2 cache of cluster-B is connected to the ACP of the L1 cache of cluster-A through the bus. Evidently, based on the architecture in FIG. 3-b, the multi-processor device may be connected to more clusters.

As shown in FIG. 3-c, taking the processing of data N as an example, a method for implementing multi-processor memory coherency in another embodiment may include the following steps:

301. When cluster-A needs to process data N, cluster-A may send a control signal for reading data N. Here it is assumed that data N is currently maintained by cluster-B.

302. The L2 cache of cluster-A receives the control signal of cluster-A for reading data N. If the L2 cache of cluster-A finds that data N is currently maintained by cluster-B, the L2 cache of cluster-A reads data N in the L1 cache of cluster-B through the ACP of the L1 cache of cluster-B.

In this embodiment, the L2 cache and the L1 cache may be understood as hardware units capable of processing data to some extent rather than storing the data only. The L2 cache of cluster-A may read or rewrite the data.

In practice, if data N is currently buffered in the L1 cache of cluster-B, the L2 cache of cluster-A reads data N in the L1 cache of cluster-B into the L2 cache of cluster-A directly through the ACP of the L1 cache of cluster-B. In addition, if data N is currently buffered in the L2 cache of cluster-B, when the L1 cache of cluster-B knows that the L2 cache of cluster-A requests reading data N, the L1 cache of cluster-B may read data N into the L1 cache of cluster-B first, and then the L2 cache of cluster-A reads data N in the L1 cache of cluster-B into the L2 cache of cluster-A through the ACP of the L1 cache of cluster-B.

The cluster reads or writes the data in a module other than the L2 cache of the cluster, and therefore, the cluster sets the operation attribute of the control signal for reading or writing the data to "non-cacheable". The efficiency of the reading or writing operation whose operation attribute is "cacheable" is relatively higher. The amount of data read or written at a single attempt differs between the "non-cacheable" operation and the "cacheable" operation. The operation attribute of the control signal for reading or writing the data also reflects the read-write attribute of the data.

In this embodiment, when cluster-A needs to read data N, because data N is not currently maintained in the L1 cache of cluster-A, cluster-A needs to read data N in a module other than the L1 cache of cluster-A. In this case, cluster-A sets the operation attribute of the control signal for reading data N to "non-cacheable".

Here, if the L2 cache of cluster-A receives a control signal of cluster-A for reading data N, where the operation attribute of the control signal is "non-cacheable", the L2 cache of cluster-A modifies the operation attribute of the control signal for reading data N to "cacheable", and reads data N in the L1 cache of cluster-B through the ACP of the L1 cache of cluster-B. That is, the L2 cache of cluster-A may send a control signal for reading data N to the L1 cache of cluster-B through the ACP of the L1 cache of cluster-B, where the operation attribute of the control signal is "cacheable"; and read data N in the L1 cache of cluster-B.

The efficiency of the non-cacheable read-write operation is lower than that of the cacheable read-write operation. The non-cacheable read-write operation generally reads or writes data in a storage device such as a Double Data Rate (DDR) synchronous dynamic random processor or a mailbox, at a rate far lower than the rate of accessing the L1 cache of another cluster through an ACP. Therefore, the L2 cache in this embodiment modifies the operation attribute of the control signal for reading data N to "cacheable", which improves the efficiency of reading on the basis of implementing memory coherency.

In this case, the data N read by the L2 cache of cluster-A through the ACP of the L1 cache of cluster-B may be original data of a task, or may be a result of data processed by cluster-B or other clusters for one or more times.

303. The L2 cache of cluster-A provides the data N read to cluster-A for processing.

Evidently, data N provided by the L2 cache of cluster-A to cluster-A is read in the L1 cache of cluster-B which currently maintains data N, thus ensuring validity of data N and implementing memory coherency when multiple clusters process the data jointly.

304. The L2 cache of cluster-A obtains a result of data N processed by cluster-A (the processing result is expressed as data N'), and writes data N' into the L1 cache or L2 cache of cluster-B through the ACP of the L1 cache of cluster-B.

In an application scenario, if cluster-A sets the operation attribute of the control signal for buffering data N' to "non-cacheable", after the L2 cache of cluster-A receives a control signal for buffering data N', where the operation attribute of the control signal is "non-cacheable", the L2 cache of cluster-A modifies the operation attribute of the control signal for buffering data N' to "cacheable", writes data N' into the L1 cache or L2 cache of cluster-B through the ACP of the L1 cache of cluster-B, and maintains data N' in the L1 cache or L2 cache of cluster-B so that the data can be processed by cluster-B or other clusters subsequently. The method for writing data N' into the L2 cache of cluster-B may be: after data N' is written into the L1 cache of cluster-B, the L2 cache of cluster-B reads data N' from the L1 cache of cluster-B, and the L1 cache of cluster-B deletes the buffered data N'.

In addition, cluster-A may buffer data N' in the L1 cache of cluster-A; or, after obtaining data N', the L2 cache of cluster-A buffers data N' into the L2 cache of cluster-A directly. That is, data N' is maintained by cluster-A. Afterward, if cluster-B (or other clusters) needs to process data N' maintained by cluster-A, the L2 cache of cluster-B may read data N' in the L1 cache of cluster-A through the ACP of the L1 cache of cluster-A in a similar mode, and provide data N' to cluster-B for processing.

If data N' is a final processing result of a corresponding task, or, if none of the clusters needs to use or process data N' subsequently, data N' may be buffered in the L2 cache of cluster-A directly, or may be further written into the DDR instead of being written into the L1 cache or L2 cache of cluster-B through the ACP of the L1 cache of cluster-B.

It is understandable that, if cluster-B needs to process a certain data currently maintained by cluster-A, the L2 cache of cluster-B may read the data in the L1 cache of cluster-A through the ACP of the L1 cache of cluster-A in a similar mode, and provide the data to cluster-B for processing. The processing mode may be the same as that of the L2 cache of cluster-A, and is not described further.

The following description takes data processing as an example. As shown in FIG. 3-d, packet data N1 (or called "data packet N1" or "packet N1") input from a network interface is buffered into the L1 cache or L2 cache of cluster-A through the ACP of the L1 cache of cluster-A. When cluster-B needs to process packet N1, the L2 cache of cluster-B may read the packet N1 in the L1 cache of cluster-A through an ACP of the L1 cache of cluster-A, and provide the packet N1 to cluster-B for processing. To improve access efficiency, the L2 cache of cluster-B may set the operation attribute of the control signal for reading the packet N1 to "cacheable". After the packet N1 is processed, the result of processing the packet N1 is updated to the L1 cache or L2 cache of cluster-A through the ACP of the L1 cache of cluster-A. In this case, if cluster-B sets the operation attribute of the control signal for buffering the processing result of the packet N1 to "cacheable", the processing result of the packet N1 may be synchronized in the L1 cache of cluster-B, and the processing result is cleared in the L1 cache of cluster-B.

It is thus evident that in this embodiment, if multiple clusters in the multi-processor device need to process data jointly, when cluster-A needs to process data which is currently maintained by c luster-B, cluster-A uses an ACP of the L1 cache of cluster-B to read the data from the L1 cache of cluster-B, and process the data. Because the data is read from the L1 cache of cluster-B which currently maintains the data, the validity of data N is ensured. This processing mode ensures memory coherency between multiple clusters, and enables collaboration between more than four processors.

Further, the L2 cache of the cluster changes the operation attribute of the control signal for reading/writing the data flexibly to improve the access efficiency; all configurations can be implemented through lower-layer software, and are completely transparent to the upper-layer applications; the configured pipeline is executed between clusters, and the resources such as ACP interface bandwidth can be allocated more flexibly and reasonably according to the occupation state of the L2 cache, thus further improving the running efficiency of the multi-processor device.

Embodiment 3

Figure 4:
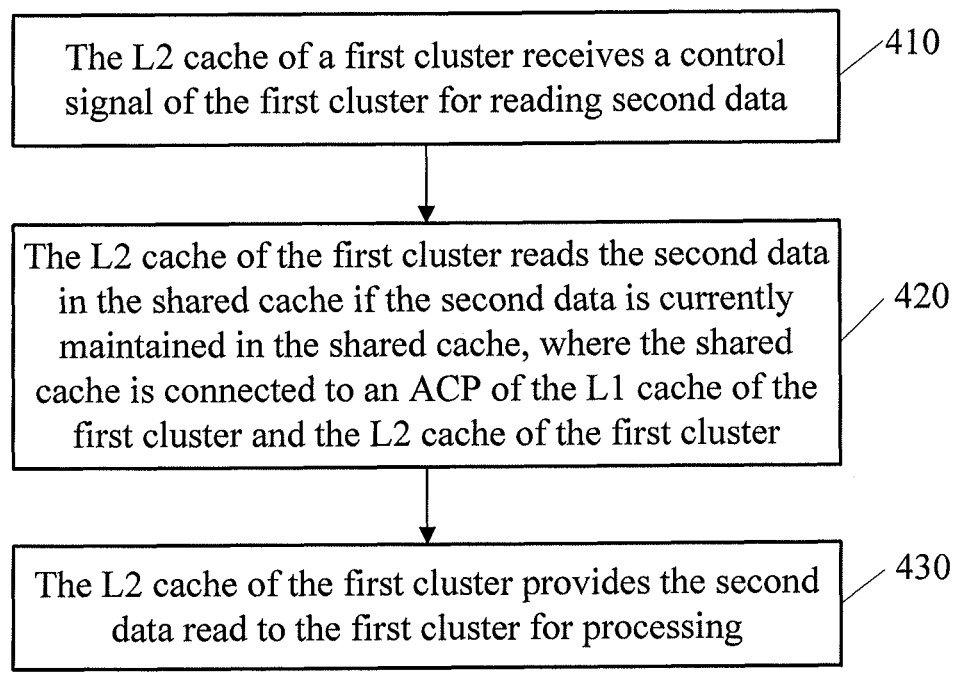
FIG. 4 is a flowchart of a method for implementing multi-processor memory coherency in a third embodiment of the present invention.

This embodiment deals with the process of implementing multi-processor memory coherency of the first cluster, assuming that the multi-processor device in ARM Cortex-A9 architecture includes at least a first cluster and a second cluster which process data jointly, where an L2 cache of the first cluster is responsible for implementing multi-processor memory coherency of the first cluster. In this embodiment, a shared cache is added in the multi-processor device, and the shared cache is connected to the ACP of the L1 cache of each cluster and the L2 cache of each cluster. This shared cache is used to implement multi-processor memory coherency. As shown in FIG. 4, a method for implementing multi-processor memory coherency in another embodiment may include the following steps:

410. The L2 cache of the first cluster receives a control signal of the first cluster for reading second data.

In an application scenario, when the first cluster needs to process the second data, the first cluster may send a control signal for reading the second data, for example, when the second data is currently maintained in the shared cache.

420. The L2 cache of the first cluster reads the second data in the shared cache if the second data is currently maintained in the shared cache, where the shared cache is connected to an ACP of the L1 cache of the first cluster and the L2 cache of the first cluster.

430. The L2 cache of the first cluster provides the second data read to the first cluster for processing.

In practice, an interface such as an AXI bus interface or an M-F interface may be set on the L2 cache of the cluster. The L2 cache may be connected to the system bus through the AXI bus interface, or connected to other devices through the M-F interface.

For example, the L2 cache of the first cluster is connected to the shared cache through the M-F interface directly, and the ACP of the L1 cache of the first cluster is connected to the shared cache through the ACP of the L1 cache of the first cluster directly or through a bus (namely, the ACP of the L1 cache of the first cluster, the M-F interface of the L2 cache, and the corresponding interface of the shared cache are connected to the bus separately; it is understandable that in this architecture, the ACP of the L1 cache of one or more other clusters and the M-F interface of the L2 cache may also be connected to the bus to implement interworking between multiple clusters and the shared cache). With the shared cache being connected to the M-F interface of the L2 cache and the ACP of the L1 cache through the bus, the clusters are highly extensible.

In this case, through the M-F interface of the L2 cache of the first cluster, it is practicable to read the second data in the shared cache. The second data may be original data, or a result of data processed by the second cluster or other clusters for one or more times. The data in the L1 cache of the first cluster or second cluster may be written into the shared cache through the ACP of the L1 cache of the first cluster or second cluster.

Further, after the first cluster processes the second data and obtains a result of processing the second data, the result may be written into the shared cache through the ACP of the L1 cache of the first cluster. Specifically, a control signal controls the shared cache to read the result of processing the second data in the L1 cache of the first cluster through the ACP of the L1 cache of the first cluster, and buffer the result. Alternatively, the result of the second data processed by the first cluster may be obtained and buffered in the L2 cache of the first cluster (for example, when the result of the second data processed by the first cluster is already a final processing result of a corresponding task, or, when none of the clusters needs to use or process the result again in the subsequent process).

If the second cluster also needs to participate in the inter-cluster processing, the L2 cache of the second cluster may be connected to the shared cache through an M-F interface or an ACP of the L1 cache directly, or through a bus (namely, the ACP of the L1 cache of the second cluster, the M-F interface of the L2 cache, and the corresponding interface of the shared cache are connected to the bus separately). The multi-processor memory coherency of the second cluster may also be mainly implemented by the L2 cache of the second cluster. The implementation process is similar to the practice of the L2 cache of the first cluster, and is not described further.

It is thus evident that in this embodiment, if multiple clusters in the system need to process data jointly, a shared cache is added and connected to the ACP of the L1 cache and the L2 cache of each cluster. When the first cluster needs to process data which is currently maintained in the shared cache, the L2 cache of the first cluster reads the data in the shared cache and provides the data to the first cluster for processing. Because the data that requires joint processing of multiple clusters is maintained in the shared cache, all clusters obtain the data from the shared cache. This processing mode ensures memory coherency between multiple clusters, and enables collaboration between more than four processors.

Embodiment 4

The following description still assumes that a multi-processor device in ARM Cortex-A9 architecture includes at least cluster-A and cluster-B which process data jointly.

In this embodiment, the connection relation between cluster-A and cluster-B of the multi-processor device in this embodiment may be shown in FIG. 5-a. In this architecture, the SCU of cluster-A is connected to the L2 cache of cluster-A; the AXI bus interface of the L2 cache of cluster-A is connected to the system bus; the ACP of the L1 cache and the M-F interface of the L2 cache of cluster-A are connected to the shared cache directly; the SCU of cluster-B is connected to the L2 cache of cluster-B; the AXI bus interface of the L2 cache of cluster-B is connected to the system bus; and the ACP of the L1 cache and the M-F interface of the L2 cache of cluster-B are connected to the shared cache directly. Alternatively, as shown in FIG. 5-b, the ACP of the L1 cache and the M-F interface of the L2 cache of cluster-A are connected to the bus; the ACP of the L1 cache and the M-F interface of the L2 cache of cluster-A are connected to the bus; and the shared cache is connected to the bus. That is, the ACP of the L1 cache and the M-F interface of the L2 cache of cluster-A are connected to the shared cache through the bus; the ACP of the L1 cache and the M-F interface of the L2 cache of cluster-B are connected to the shared cache through the bus. Evidently, based on the architecture shown in FIG. 5-b, the multi-processor device can be extended and connected to more clusters.

As shown in FIG. 5-c, taking the processing of data M as an example, a method for implementing multi-processor memory coherency in another embodiment may include the following steps:

501. When cluster-A needs to process data M, cluster-A may send a control signal for reading data M. Here it is assumed that data M is currently maintained in the shared cache.

502. The L2 cache of cluster-A receives the control signal of cluster-A for reading data M. If the L2 cache of cluster-A finds that data M is currently maintained in the shared cache, the L2 cache of cluster-A reads data M in the shared cache, and provides data M to cluster-A for processing.

In this case, the data M read by the L2 cache of cluster-A from the shared cache may be original data of a task, or may be result data which is written into the shared cache through the ACP of the L1 cache after the data is processed by cluster-B or other clusters for one or more times.

503. Assuming that the result of data M processed by cluster-A is M', the L2 cache of cluster-A uses the control signal to control the shared cache to read M' in the L1 cache of cluster-A through the ACP of the L1 cache of cluster-A, and buffer M' so that cluster-B or other clusters can process M' subsequently.

In addition, if data M' is a final processing result of a corresponding task, or, if none of the clusters needs to use or process data M' subsequently, data M' may be buffered in the L2 cache of cluster-A directly, or may be further written into the DDR instead of being written into the shared cache through the ACP of the L1 cache of cluster-B.

It is understandable that, if cluster-B needs to process a certain data currently maintained in the shared cache, the L2 cache of cluster-B may read the data in the shared cache in a similar way, and provide the data to cluster-B for processing; and may write the result of processing the data into the shared cache through the ACP of the L1 cache of cluster-B, or buffer the result in the L2 cache of cluster-B. The processing mode may be the same as that of the L2 cache of cluster-A, and is not described further.

It is thus evident that in this embodiment, if multiple clusters in the multi-processor device need to process data jointly, a shared cache is added and connected to the ACP of the L1 cache and the L2 cache of each cluster. When cluster-A needs to process data which is currently maintained in the shared cache, the L2 cache of cluster-A reads the data in the shared cache and provides the data to cluster-A for processing. Because the data that requires joint processing of multiple clusters is maintained in the shared cache, all clusters obtain the data from the shared cache. This processing mode ensures memory coherency between multiple clusters, and enables collaboration between more than four processors.

Further, the shared cache helps improve the access efficiency and reduce the physical area of the L2 cache; all configurations can be implemented through lower-layer software, and are completely transparent to the upper-layer applications; the configured pipeline is executed between clusters, and the resources such as ACP interface bandwidth can be allocated more flexibly and reasonably according to the occupation state of the L2 cache, thus further improving the running efficiency of the multi-processor device.

Moreover, a multi-processor device is provided in an embodiment of the present invention.

Embodiment 5

As shown in FIG. 6-a and FIG. 6-b, a multi-processor device provided in this embodiment may include: a first cluster 610, a second cluster 620, an L2 cache 612 of the first cluster, and an L2 cache 622 of the second cluster, where the L2 cache 612 of the first cluster is connected to the ACP of the L1 cache of the second cluster 620. Specifically, the L2 cache 612 of the first cluster is connected to the ACP of the L1 cache of the second cluster 620 directly, or through a bus (namely, the L2 cache 612 of the first cluster and the L1 cache 622 of the second cluster are connected to the bus separately).

The L2 cache 612 of the first cluster is configured to: receive a control signal of the first cluster 610 for reading first data; read the first data in the L1 cache of the second cluster 620 through the ACP of the L1 cache of the second cluster 620 if the first data is currently maintained by the second cluster 620; and provide the first data read to the first cluster 610 for processing.

In an application scenario, the L2 cache 612 of the first cluster is further configured to: obtain a result of the first data processed by the first cluster 610; write the result of the first data processed by the first cluster 610 into the L1 cache or L2 cache of the second cluster 620 through the ACP of the L1 cache of the second cluster 620; or, buffer the result of the first data processed by the first cluster 610 into the L2 cache 612 of the first cluster 610.

In an application scenario, the L2 cache 612 of the first cluster may include:

a first receiving module, configured to receive a control signal of the first cluster 610 for reading the first data, where the operation attribute of the control signal is "non-cacheable";

a first reading module, configured to send the control signal for reading the first data to the L1 cache of the second cluster 620 through an ACP of the L1 cache of the second cluster 620 when the first data is currently maintained by the second cluster 620, where the operation attribute of the control signal is "cacheable"; and read the first data in the L1 cache of the second cluster 620; and a first providing module, configured to provide the first data read by the first reading module to the first cluster 601 for processing.

In an application scenario, the L2 cache 622 of the second cluster is connected to the ACP of the L1 cache of the first cluster 610 directly or through a bus.

The L2 cache 622 of the second cluster is configured to: receive a control signal of the second cluster 620 for reading a third data; read the third data in the L1 cache of the first cluster 610 through the ACP of the L1 cache of the first cluster 610 if the third data is currently maintained by the first cluster 610; and provide the third data read to the second cluster 620 for processing.

In an application scenario, the L2 cache 622 of the second cluster is further configured to: obtain a result of the third data processed by the second cluster 620; write the result of the third data processed by the second cluster 620 into the L1 cache or L2 cache of the first cluster 610 through the ACP of the L1 cache of the first cluster 610; or, buffer the result of the third data processed by the second cluster 620 into the L2 cache 622 of the second cluster.

In an application scenario, the L2 cache 622 of the second cluster may include:

a second receiving module, configured to receive a control signal of the second cluster 620 for reading the third data, where the operation attribute of the control signal is "non-cacheable";

a second reading module, configured to send the control signal for reading the third data to the L1 cache of the first cluster 610 through an ACP of the L1 cache of the first cluster 610 when the third data is currently maintained by the first cluster 610, where the operation attribute of the control signal is "cacheable"; and read the third data in the L1 cache of the first cluster 610;

a second providing module, configured to provide the third data read by the second reading module to the second cluster 620 for processing.

It is understandable that the functions of the components of the multi-processor device 600 may be implemented according to the method in the foregoing embodiments, and are not described further. The multi-processor device 600 may be a network device such as a router or a switch.

It is thus evident that in this embodiment, if multiple clusters in the multi-processor device 600 need to process data jointly, when the L2 cache of the first cluster finds that the first cluster needs to process data which is currently maintained by the second cluster, the L2 cache of the first cluster uses an ACP of the L1 cache of the second cluster to read the data from the L1 cache of the second cluster, and process the data. Because the data is read from the L1 cache of the second cluster which currently maintains the data, the validity of the data is ensured. This processing mode ensures memory coherency between multiple clusters, and enables collaboration between more than four processors.

Moreover, a multi-processor device is provided in an embodiment of the present invention.

Embodiment 6

As shown in FIG. 7-a and FIG. 7-b, a multi-processor device 700 provided in this embodiment may include: a first cluster 710, a second cluster 720, a shared cache 730, an L2 cache 712 of the first cluster, and an L2 cache 722 of the second cluster.

The shared cache 730 is connected to the L2 cache 712 of the first cluster and an ACP of an L1 cache of the first cluster 710. Specifically, the L2 cache 712 of the first cluster and the ACP of the L1 cache of the first cluster 710 may be directly connected to the shared cache 730 separately, or connected to the shared cache 730 through a bus. That is, the L2 cache 712 of the first cluster, the ACP of the L1 cache of the first cluster 710, and the shared cache 730 are connected to the bus separately.

The L2 cache 712 of the first cluster is configured to: receive a control signal of the first cluster 710 for reading the second data; read the second data in the shared cache 730 if the second data is currently maintained in the shared cache 730; and provide the second data read to the first cluster 710 for processing.

In an application scenario, the L2 cache 712 of the first cluster is further configured to: write the result of the second data processed by the first cluster 710 into the shared cache 730 through the ACP of the L1 cache of the first cluster 710; or, obtain the result of the second data processed by the first cluster 710; and buffer the result of the second data processed by the first cluster 710 into the L2 cache 712 of the first cluster.

In an application scenario, the L2 cache 722 of the second cluster and the ACP of the L1 cache of the second cluster 720 are connected to the shared cache 730 directly or through a bus.

The L2 cache 722 of the second cluster is configured to: receive a control signal of the second cluster 720 for reading a fourth data; read the fourth data in the shared cache 730 if the fourth data is currently maintained in the shared cache 730; and provide the read fourth data to the second cluster 720 for processing.

In an application scenario, the L2 cache 722 of the second cluster is further configured to: write the result of the fourth data processed by the second cluster 720 into the shared cache 730 through the ACP of the L1 cache of the second cluster 720; or, obtain the result of the fourth data processed by the second cluster 720; and buffer the result of the fourth data processed by the second cluster 720 into the L2 cache 722 of the second cluster.

It is thus evident that in this embodiment, if multiple clusters in the multi-processor device 700 need to process data jointly, a shared cache is added and connected to the ACP of the L1 cache and the L2 cache of each cluster. When the first cluster needs to process data which is currently maintained in the shared cache, the L2 cache of the first cluster reads the data in the shared cache and provides the data to the first cluster for processing. Because the data that requires joint processing of multiple clusters is maintained in the shared cache, all clusters obtain the data from the shared cache. This processing mode ensures memory coherency between multiple clusters, and enables collaboration between more than four processors.

It is understandable that the functions of the components of the multi-processor device 700 may be implemented according to the method in the foregoing embodiments, and are not described further. The multi-processor device 700 may be a network device such as a router or a switch.

It should be noted that for ease of description in the method embodiments above, the method is described as a series of operations. Those skilled in the art are aware that the embodiments of the present invention are not limited to the order of operations given above and that certain steps may occur in different order or occur simultaneously. Meanwhile, those skilled in the art are aware that the embodiments described herein are preferred embodiments, and that the involved operations and modules are not mandatory.

In the foregoing embodiments, each embodiment emphasizes a specific aspect, and the part not detailed in one embodiment may be detailed in another embodiment.

It is thus evident that in a solution under the present invention, if multiple clusters in the system need to process data jointly, when the first cluster needs to process data which is currently maintained by the second cluster, the first cluster uses an ACP of the L1 cache of the second cluster to read the data from the L1 cache of the second cluster, and process the data. Because the data is read from the L1 cache of the second cluster which currently maintains the data, the validity of the data is ensured. This processing mode ensures memory coherency between multiple clusters.

Further, the L2 cache of the cluster changes the operation attribute of the control signal for reading/writing the data flexibly to improve the access efficiency; all configurations can be implemented through lower-layer software, and are completely transparent to the upper-layer applications; the configured pipeline is executed between clusters, and the resources such as ACP interface bandwidth can be allocated more flexibly and reasonably according to the occupation state of the L2 cache, thus further improving the running efficiency of the multi-processor device.

In another solution under the present invention, if multiple clusters in the system need to process data jointly, a shared cache is added and connected to the ACP of the L1 cache and the L2 cache of each cluster. When the first cluster needs to process data which is currently maintained in the shared cache, the L2 cache of the first cluster reads the data in the shared cache and provides the data to the first cluster for processing. Because the data that requires joint processing of multiple clusters is maintained in the shared cache, all clusters obtain the data from the shared cache. This processing mode ensures memory coherency between multiple clusters.

Further, the shared cache helps improve the access efficiency and reduce the physical area of the L2 cache; all configurations can be implemented through lower-layer software, and are completely transparent to the upper-layer applications; the configured pipeline is executed between clusters, and the resources such as ACP interface bandwidth can be allocated more flexibly and reasonably according to the occupation state of the L2 cache, thus further improving the running efficiency of the multi-processor device.

Persons of ordinary skill in the art should understand that all or part of the steps of the method in the embodiments of the present invention may be implemented by a program instructing relevant hardware. The program may be stored in a computer readable storage medium. The storage medium may be a Read Only Memory (ROM), a Random Access Memory (RAM), a magnetic disk, or a Compact Disk-Read Only Memory (CD-ROM).

Expounded above are a method and an apparatus for implementing multi-processor memory coherency under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A method for implementing multi-processor memory coherency, comprising: receiving, by a Level-2 (L2) cache of a first cluster, a control signal of the first cluster for reading first data; reading the first data in a Level-1 (L1) cache of a second cluster through an Accelerator Coherency Port (ACP) of the L1 cache of the second cluster if the first data is currently maintained by the second cluster, wherein the L2 cache of the first cluster is connected to the ACP of the L1 cache of the second cluster; and providing the first data read to the first cluster for processing, obtaining a result of the first data processed by the first cluster; and one of: writing the result of the first data processed by the first cluster into one of the L1 cache or L2 cache of the second cluster through the ACP of the L1 cache of the second cluster; or buffering the result of the first data processed by the first cluster into the L2 cache of the first cluster;

wherein: receiving the control signal of the first cluster for reading the first data comprises: receiving the control signal of the first cluster for reading the first data, wherein an operation attribute of the control signal is "non-cacheable"; and reading the first data in the L1 cache of the second cluster through the ACP of the L1 cache of the second cluster comprises: sending a control signal for reading the first data to the L1 cache of the second cluster through the ACP of the L1 cache of the second cluster, wherein the operation attribute of the control signal is "cacheable"; and reading the first data in the L1 cache of the second cluster.

2. A multi-processor device, comprising a first cluster, a second cluster, a Level-2 (L2) cache of the first cluster, and an L2 cache of the second cluster, wherein: the L2 cache of the first cluster is connected to an Accelerator Coherency Port (ACP) of a Level-1 (L1) cache of the second cluster; and the L2 cache of the first cluster is configured to: receive a control signal of the first cluster for reading first data; read the first data in the L1 cache of the second cluster through the ACP of the L1 cache of the second cluster if the first data is currently maintained by the second cluster; and provide the first data read to the first cluster for processing, wherein:

the L2 cache of the first cluster is further configured to: obtain a result of the first data processed by the first cluster; write the result of the first data processed by the first cluster into the L1 cache or L2 cache of the second cluster through the ACP of the L1 cache of the second cluster; or, buffer the result of the first data processed by the first cluster into the L2 cache of the first cluster; and wherein: the L2 cache of the first cluster comprises: a first receiving module, configured to receive the control signal of the first cluster for reading the first data, wherein an operation attribute of the control signal is "non-cacheable"; a first reading module, configured to send a control signal for reading the first data to the L1 cache of the second cluster through the ACP of the L1 cache of the second cluster when the first data is currently maintained by the second cluster, wherein the operation attribute of the control signal is "cacheable"; and read the first data in the L1 cache of the second cluster; and a first providing module, configured to provide the first data read by the first reading module to the first cluster for processing.

* * * * *